(12) United States Patent
Hamano et al.

(10) Patent No.: US 11,268,865 B2
(45) Date of Patent: Mar. 8, 2022

(54) TEMPERATURE MEASURING DEVICE AND METHOD FOR MEASURING TEMPERATURE

(71) Applicant: Socionext Inc., Kanagawa (JP)

(72) Inventors: Hiroyuki Hamano, Kanagawa (JP); Takashi Miyazaki, Kanagawa (JP)

(73) Assignee: SOCIONEXT INC., Yokohama (JP)

( * ) Notice: Subject to any disclaimer, the term of this patent is extended or adjusted under 35 U.S.C. 154(b) by 199 days.

(21) Appl. No.: 16/674,928

(22) Filed: Nov. 5, 2019

(65) Prior Publication Data
US 2020/0064206 A1 Feb. 27, 2020

Related U.S. Application Data

(63) Continuation of application No. PCT/JP2017/018169, filed on May 15, 2017.

(51) Int. Cl.
*G01K 7/01* (2006.01)
*G01K 3/00* (2006.01)

(52) U.S. Cl.
CPC .............. *G01K 7/01* (2013.01); *G01K 3/005* (2013.01); *G01K 2219/00* (2013.01)

(58) Field of Classification Search
CPC ....... G01K 7/01; G01K 3/005; G01K 2219/00
See application file for complete search history.

(56) References Cited

U.S. PATENT DOCUMENTS

| | | | |
|---|---|---|---|
| 6,149,299 A | 11/2000 | Aslan et al. | |
| 7,010,440 B1 * | 3/2006 | Lillis | G01K 7/01 327/512 |
| 7,342,390 B2 * | 3/2008 | Tachibana | G05F 3/30 323/313 |
| 8,217,708 B2 | 7/2012 | Kiyoshi | |
| 8,308,358 B2 * | 11/2012 | Doorenbos | G01K 7/01 374/172 |

(Continued)

FOREIGN PATENT DOCUMENTS

| | | |
|---|---|---|
| CN | 101738262 A | 6/2010 |
| CN | 104949767 A | 9/2015 |
| JP | H11-211574 A | 8/1999 |
| JP | 2011-220777 A | 11/2011 |
| JP | 2015-190799 A | 11/2015 |

OTHER PUBLICATIONS

International Search Report of International Application No. PCT/JP2017/018169 dated Aug. 15, 2017.

(Continued)

*Primary Examiner* — Nathaniel T Woodward
*Assistant Examiner* — Philip L Cotey
(74) *Attorney, Agent, or Firm* — Arent Fox LLP (57) ABSTRACT

A temperature measuring device includes first and second semiconductor elements each of which has a p-n junction, a transistor group including a plurality of transistors of which respective sources are connected to a power source and of which respective gates are connected to each other, the plurality of transistors constituting a current source, the transistor group being configured to output a first current and a second current having a different magnitude from the first current to the first and second semiconductor elements, respectively, and a selector configured to select at least one first transistor and a plurality of second transistors different from the first transistor, from among the plurality of transistors.

7 Claims, 10 Drawing Sheets

(56) References Cited

U.S. PATENT DOCUMENTS

| | | | |
|---|---|---|---|
| 9,977,111 B2* | 5/2018 | Li ............................ | G05F 3/02 |
| 10,352,775 B2* | 7/2019 | Pan .......................... | G01K 3/06 |
| 2010/0123510 A1* | 5/2010 | Yoshikawa .............. | G01K 7/01 |
| | | | 327/512 |
| 2015/0063419 A1* | 3/2015 | Obayashi ................. | G01K 7/01 |
| | | | 374/163 |
| 2015/0117495 A1* | 4/2015 | Tiruvuru .................. | G01K 7/01 |
| | | | 374/178 |
| 2015/0276497 A1* | 10/2015 | Miyazaki ................. | G01K 7/16 |
| | | | 374/170 |
| 2016/0178450 A1 | 6/2016 | Trifonov et al. | |
| 2019/0155323 A1* | 5/2019 | Kim ................... | H03F 3/45475 |

OTHER PUBLICATIONS

Written Opinion of The International Searching Authority of International Application No. PCT/JP2017/018169 dated Aug. 15, 2017.
Chinese Office Action issued by the Chinese Patent Office corresponding to Chinese Patent Application No. 201780090565.5, dated Sep. 17, 2020.
Extended European Search Report issued by the European Patent Office in corresponding European Patent Application No. 17910027.6, dated Mar. 30, 2020.
Japanese Office Action issued by the Japanese Patent Office corresponding to Japanese Patent Application No. 2019-518608, dated May 27, 2021.

* cited by examiner

| COM-BINATION | CURRENT OF Q1 | CURRENT OF Q2 | $\Delta V_{be}$ DIGITALIZED BY ADC |
|---|---|---|---|
| j = 1 | 1.1I | 3I | $(kT_a/e)*\ln(3/1.1)$ |
| j = 2 | I | 3.1I | $(kT_a/e)*\ln(3.1/1)$ |
| j = 3 | I | 3.1I | $(kT_a/e)*\ln(3.1/1)$ |
| j = 4 | I | 3.1I | $(kT_a/e)*\ln(3.1/1)$ |
| I = 1 | 3I | 1.1I | $(kT_a/e)*\ln(3/1.1)$ |
| I = 2 | 3.1I | I | $(kT_a/e)*\ln(3.1/1)$ |
| I = 3 | 3.1I | I | $(kT_a/e)*\ln(3.1/1)$ |
| I = 4 | 3.1I | I | $(kT_a/e)*\ln(3.1/1)$ |

TEMPERATURE MEASURING DEVICE AND METHOD FOR MEASURING TEMPERATURE

CROSS-REFERENCE TO RELATED APPLICATION

This application is a continuation application of International Application No. PCT/JP2017/018169 filed on May 15, 2017, and designated the U.S., the entire contents of which are incorporated herein by reference.

BACKGROUND OF THE INVENTION

1. Field of the Invention

The present disclosure relates to a temperature measuring device and a method for measuring temperature.

2. Description of the Related Art

Temperature measuring devices that improve accuracy of temperature measurement with suppressing increases in area have been proposed.

As an example, such a temperature measuring device includes a current source unit that produces a current used as a reference to temperature measurement, a sensor unit that produces a voltage proportional to an absolute temperature based on a current value, and an ADC unit that executes the process of A/D conversion of the voltage. With respect to such a temperature measuring device, in order to measure temperature, selection is dynamically performed with a switch. Consequently, detecting and correcting mismatches between transistors as well as between resistors, which constitute part of each of the current source unit, the sensor unit and the ADC unit, is known.

Further, with respect to the temperature measuring device, it is common practice to have the current source unit and the sensor unit each of which has a first transistor through which a first current flows in accordance with a control voltage and, further, each of which has a second transistor which outputs a second current different from the first current. See, Japanese Unexamined Patent Application Publication No. 2015-190799.

SUMMARY OF THE INVENTION

However, in the art known to the inventors, as described above, such a mismatch cannot be corrected, between the first transistor provided with the current source unit and the first transistor provided with the sensor unit, as well as between the second transistor provided with the current source unit and the second transistor provided with the sensor unit.

In order to maintain accuracies of the temperature measurement, each of the first and second transistors in the art known to the inventors needs to have a element size to an extent such that effects of mismatch are suppressed. This leads to difficulties in decreasing size.

The disclosed technique is directed to a temperature measuring device, including: first and second semiconductor elements each of which has a p-n junction; a transistor group including a plurality of transistors of which respective sources are connected to a power source and of which respective gates are connected to each other, the plurality of transistors constituting a current source, the transistor group being configured to output a first current and a second current having a different magnitude from the first current to the first and second semiconductor elements, respectively; and a selector configured to select at least one first transistor and a plurality of second transistors different from the first transistor, from among the plurality of transistors, so that a drain of the first transistor is connected to one of the first and second semiconductor elements and a drain of each of the plurality of second transistors is connected to another of the first and second semiconductor elements.

DESCRIPTION OF THE PREFERRED EMBODIMENTS

First Embodiment

Figure 1:
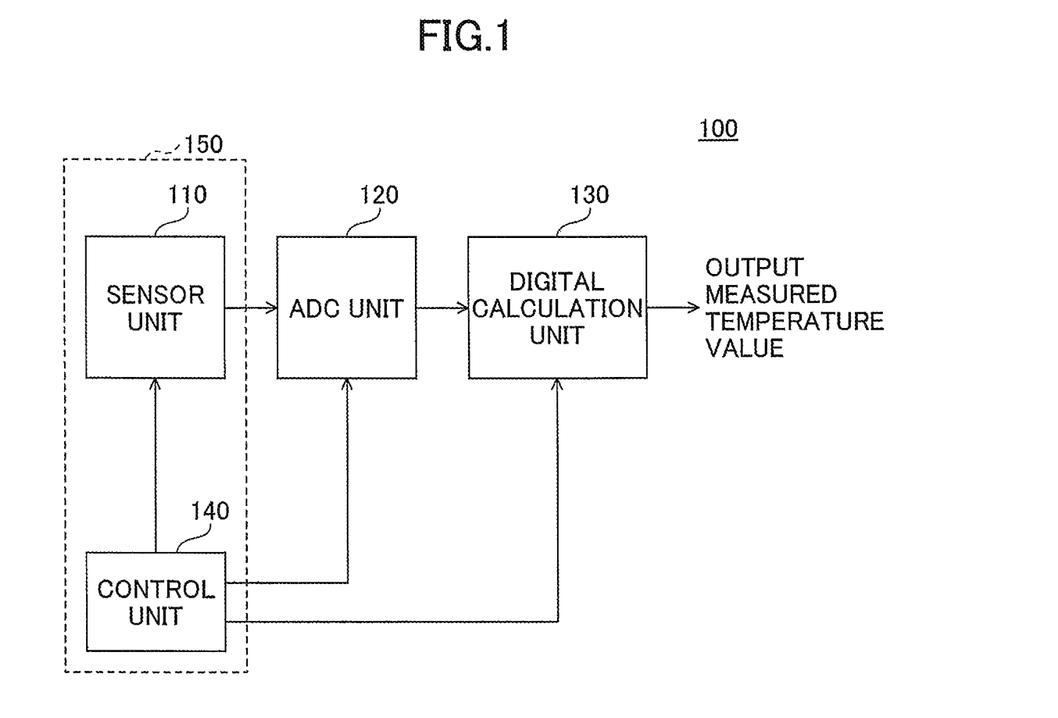
FIG. 1 is a diagram for explaining a temperature measuring device according to a first embodiment.

Explanation will be hereinafter provided for a first embodiment with reference to the drawings. FIG. 1 is a diagram for explaining a temperature measuring device according to the first embodiment.

A temperature measuring device 100 in the present embodiment includes a sensor unit 110, an ADC (Analog to Digital Converter) unit 120, a digital calculation unit 130, and a control unit 140.

The sensor unit 110 includes a current source from which a current used as a reference to temperature measurement flows, and converts a temperature into a voltage value. In the present embodiment, with the current source being included in the sensor unit 110, downsizing of the temperature measuring device 100 is achieved. The sensor unit 110 will be described in detail below.

The ADC unit 120 converts a voltage outputted by the sensor unit 110 to a digital value, by A/D (Analog to Digital) conversion. The digital calculation unit 130 calculates a measured temperature value T by a process of calculating the digital value outputted by the ADC unit 120. The control unit 140 controls the sensor unit 110, the ADC unit 120, and the digital calculation unit 130.

Note that in the example of FIG. 1, the temperature measuring device 100 includes the ADC unit 120 and the digital calculation unit 130, but is not limited thereto. For example, the ADC unit 120 and the digital calculation unit 130 may be provided outside the temperature measuring device. In this case, the sensor unit 110 and the control unit 140 can constitute a temperature measuring device 150.

Figure 2:
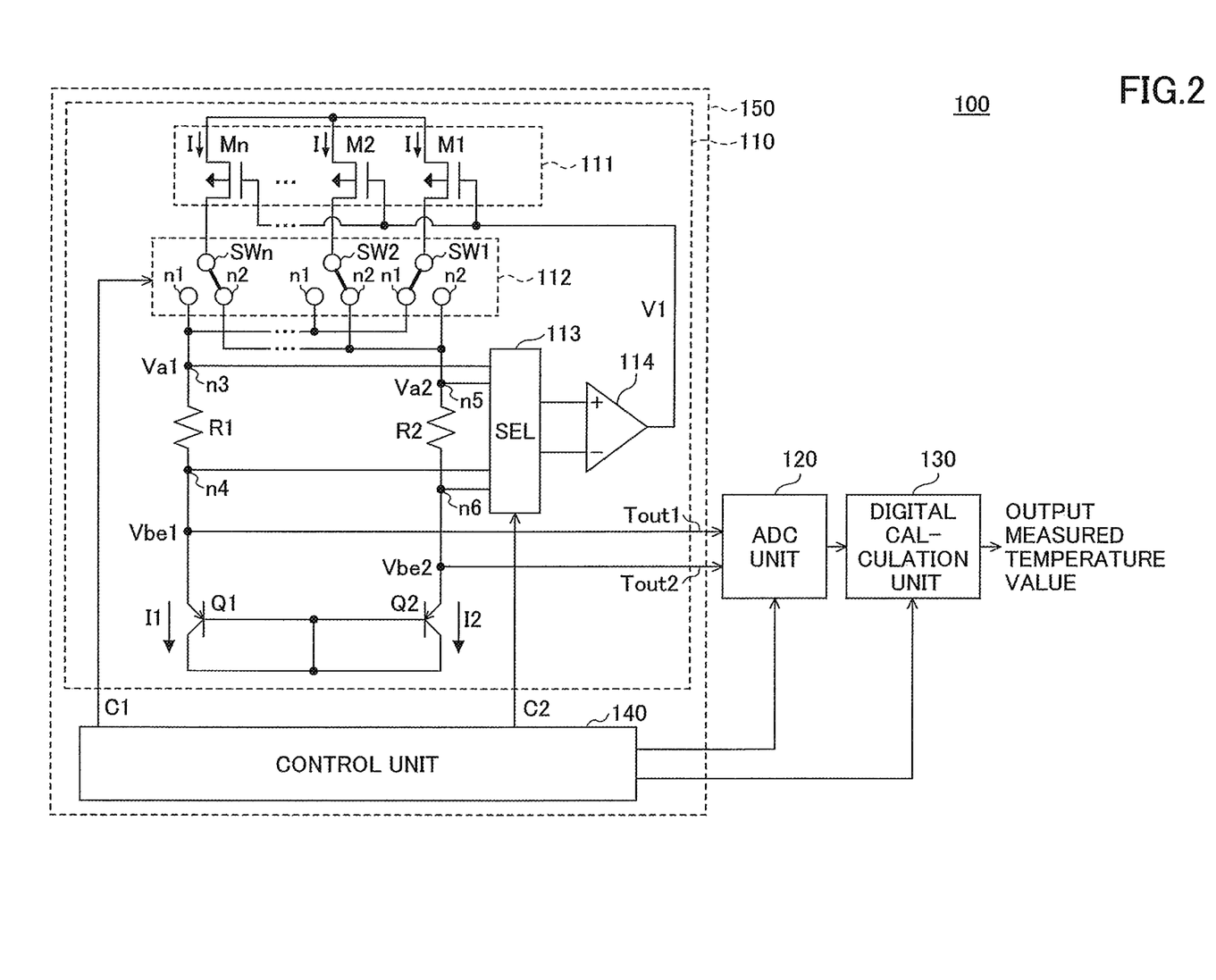
FIG. 2 is a diagram for explaining a configuration of a sensor unit according to the first embodiment.

Hereafter, the sensor unit 110 in the present embodiment is described with reference to FIG. 2. FIG. 2 is a diagram for explaining a configuration of the sensor unit according to the first embodiment.

The sensor unit 110 in the present embodiment includes transistors Q1 and Q2, a transistor group 111, a resistor R1, a resistor R2, a selector 112, a selector 113, and an amplifier 114.

With the operation to be described below, the temperature measuring device 100 in the embodiment suppresses effects of a mismatch between transistors in the transistor group 111 provided with the sensor unit 110, as well as of a mismatch between the transistor Q1 and the transistor Q2, on temperature measurement. Further, with the operation described below, the temperature measuring device 100 in the present embodiment also suppresses effects of variations between the resistor R1 and the resistor R2, as well as of an offset of the amplifier 114, on temperature measurement.

More specifically, in the present embodiment, the operation described below decreases an error being a difference between a base-to-emitter voltage Vbe1 of the transistor Q1 and a base-to-emitter voltage Vbe2 of the transistor Q2, caused by a mismatch between transistors or/and between resistors of sensor unit 110. The base-to-emitter voltage Vbe1 refers to a forward voltage across a P-N junction in the transistor Q1, and the base-to-emitter voltage Vbe2 refers to a forward voltage across a P-N junction in the transistor Q2.

In the present embodiment, by decreasing an error being a difference between the base-to-emitter voltage Vbe1 of the transistor Q1 and the base-to-emitter voltage Vbe2 of the transistor Q2, effects of the mismatch on a measured temperature value T can be suppressed, and thus the accuracy of temperature measurement is able to be improved.

Note that in the present embodiment, the mismatch between the transistor Q1 and the transistor Q2 means that there is a difference in current characteristics of the base-to-emitter voltages between the transistors Q1 and Q2. Also, in the present embodiment, the mismatch between the resistor R1 and the resistor R2 means that there is a difference in resistance values between the resistor R1 and the resistor R2. Further, in the present embodiment, a mismatch between the transistor M1 and the transistor M2 means that there is an error between a designed current ratio and a current ratio of a current flowing into the transistor M1 to a current flowing into the transistor M2.

Note that the mismatch used in the present embodiment means variation in characteristics in a case where two transistors having a same configuration are disposed adjacent to each other.

In the present embodiment, as described above, effects of mismatch between transistors and between resistors, as well as of an offset of the amplifier, are suppressed, thereby improving the accuracy of temperature measurement. The sensor unit 110 is further described in detail hereafter.

The transistors Q1 and Q2 in the present embodiment are a pair of bipolar transistors having respective p-n junctions. In the example of FIG. 2, each of the transistors Q1 and Q2 is a pnp transistor, but is not limited thereto. Each of the transistors Q1 and Q2 may be an npn transistor. In the present embodiment, diodes may be used instead of the respective transistors Q1 and Q2.

The transistor group 111 in the present embodiment has field effect transistors M1, M2, . . . , and Mn. For example, each of the field effect transistors M1, M2, . . . , and Mn in the present embodiment is a p-channel MOSFET having a same size. In this description, n can be selected with any integer value.

The transistor group 111 in the present embodiment is a current source, and constitutes a current source circuit in which respective sources of transistors M1, M2, . . . , and Mn are connected to a power source and in which respective gates are connected to each other.

The selector 112 in the present embodiment includes switches SW1, SW2, . . . , and SWn that are each controlled in accordance with a control signal C1 transmitted by the control unit 140. Each of the switches SW1, SW2, . . . , and SWn in the present embodiment has nodes n1 and n2. Each node n1 is a node where a destination to which a drain of a given transistor in the transistor group 111 is connected is the transistor Q1, and each node n2 is a node where a destination to which a drain of a given transistor in the transistor group 111 is the transistor Q2.

In the sensor unit 110 in the present embodiment, a base and a collector with respect to each of the transistors Q1 and Q2 are connected to a common potential (e.g., a ground potential). In the present embodiment, an emitter of the transistor Q1 is connected to one end of the resistor R1, and an emitter of the transistor Q2 is connected to one end of the resistor R2.

Another end of the resistor R1 is connected to a node n1 of each of the switches SW1, SW2, . . . , and SWn, and another end of the resistor R2 is connected to a node n2 of each of the switches SW1, SW2, . . . , and SWn. The other ends of the switches SW1, SW2, . . . , and SWn are connected to the respective transistors M1, M2, . . . , and Mn.

In accordance with a control signal C2 transmitted by the control unit 140, the selector 113 in the present embodiment switches destinations to which the amplifier 114 is connected. Specifically, in accordance with the control signal C2, the selector 113 allows respective destinations to which the non-inverting input terminal and the inverting input terminal of the amplifier 114 are connected to be either of: a node n3 and a node n6, or a node n4 and a node n5.

The amplifier 114 in the present embodiment applies an output voltage V1 to the gate of each of the transistors in the transistor group 111, causing a current I to flow in each of the transistors M1, M2, . . . , and Mn flows, such that a voltage at the non-inverting input terminal is equal to a voltage at the inverting input terminal by a negative feedback arrangement.

With respect to the sensor unit 110, an output terminal Tout1 is connected to the node n4, and an output terminal Tout2 is connected to the node n6. In such a manner, in the sensor unit 110 in the present embodiment, the base-to-emitter voltage Vbe1 across the transistor Q1 is output from the output terminal Tout1, and the base-to-emitter voltage Vbe2 across the transistor Q2 is outputted from the output terminal Tout2. Each of the voltages outputted by the sensor unit 110 is supplied to the ADC unit 120.

The ADC unit 120 outputs, to the digital calculation unit 130, a voltage expressing a difference between the base-to-emitter voltage Vbe1 and the base-to-emitter voltage Vbe2, as a digital value.

In the example of FIG. 2, in accordance with a control signal C1, the selector 112 causes the drain of the transistor M1 in the transistor group 111 to be connected to the node n1, and causes the drains of the other transistors M2 to Mn to be connected to the respective nodes n2.

In this description, the transistor group 111 in the present embodiment is controlled in accordance with the output voltage V1 from the amplifier 114, and thus a current flowing to each of the transistors M1, M2, . . . , and Mn is indicated by a current I.

Accordingly, in the example of FIG. 2, the current I is given by I=the current I1 flowing into the resistor R1 and the transistor Q1. A current I2 flowing into the resistor R2 and the transistor Q2 is given by I2=current I×(n−1).

In such a manner, in accordance with the control signal C2, the selector 113 causes the non-inverting input terminal and the inverting input terminal of the amplifier 114 to be connected to the node n3 and the node n6, respectively. In this case, the amplifier 114 applies a voltage causing the current I to flow, to the gate of each transistor in the transistor group 111, such that a voltage Va1 at the node n3 is a voltage Vbe2 at the node n6.

Figure 3:
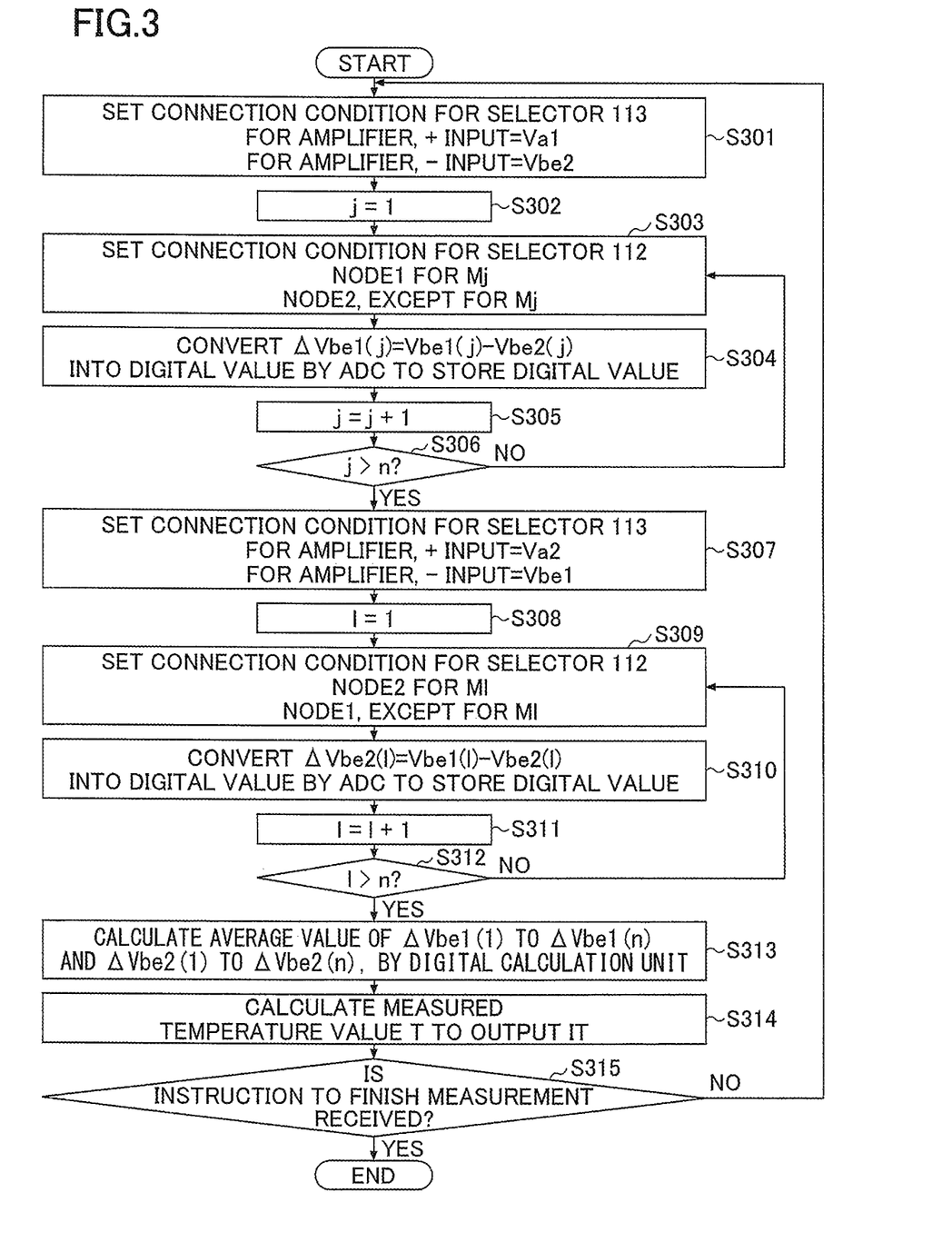
FIG. 3 is a flowchart for explaining an operation of the temperature measuring device according to the first embodiment.

Hereafter, an operation of the temperature measuring device 100 according to the present embodiment is described. FIG. 3 is a flowchart for explaining the operation of the temperature measuring device according to the first embodiment.

In the temperature measuring device 100 according to the present embodiment, when receiving an instruction to start temperature measurement from a host device of the temperature measuring device 100, the control unit 140 initiates the operation (processing) illustrated in FIG. 3. Note that, as an example, the host device of the temperature measuring device 100 includes a device that performs predetermined processing based on a detected temperature, or the like.

In the temperature measuring device 100 according to the present embodiment, when receiving an instruction to start temperature measurement, the control unit 140 sets a connection condition for the selector 113 in accordance with a control signal C2 (step S301). In this description, the selector 113 sets destinations to which the amplifier 114 is connected, as the node n3 and the node n6. In other words, the selector 113 causes a voltage Va1 to be applied to the non-inverting input terminal of the amplifier 114, and causes a voltage Vbe2 to be applied to the inverting input terminal.

Subsequently, in the temperature measuring device 100, the control unit 140 sets a parameter j as j=1 (step S302), and then sets a connection condition for the selector 112 in accordance with a control signal C1 (step S303). In this description, the selector 112 causes a transistor Mj to be connected to a given node n1, and causes transistors M other than the transistor Mj to be connected to respective nodes n2. In such a manner, the selector 113 causes one transistor in the transistor group 111 to be connected to a given node n1, and causes (n−1) transistors to be connected to respective nodes n2.

Subsequently, the control unit 140 causes the ADC unit 120 to convert a voltage ΔVbe1(j) being a difference between a voltage Vbe1(j) and a voltage Vbe2(j), each of which is supplied by the sensor unit 110, into a digital value, and then causes the digital calculation unit 130 to store the digital value (step S304).

Subsequently, in the temperature measuring device 100, the control unit 140 sets a parameter j as j=j+1 (Step S305), and determines whether or not the parameter j is greater than n (step S306). In step S306, when the parameter j is equal to or smaller than n, the control unit 140 returns to step S303.

In step S306, when the parameter j is greater than n, the control unit 140 sets a connection condition for the selector 113 in accordance with a control signal C2 (step S307). In this description, the selector 113 sets destinations to which the amplifier 114 is connected, as the node n4 and the node n5. In other words, the selector 113 causes a voltage Va2 to be applied to the non-inverting input terminal of the amplifier 114, and causes a voltage Vbe1 to be applied to the inverting input terminal.

Subsequently, in the temperature measuring device 100, the control unit 140 sets a parameter l as l=1 (step S308), and sets a connection condition for the selector 112 in accordance with a control signal C1 (step S309). In this description, the selector 112 causes a transistor M1 to be connected to a given node n2, and causes transistors M other than the transistor M1 to be connected to respective nodes n1. In such a manner, the selector 113 causes one transistor in the transistor group 111 to be connected to a given node n2, and causes (n−1) transistors to be connected to respective nodes n1.

Subsequently, the control unit 140 causes the ADC unit 120 to convert a voltage ΔVbe2(l) being a difference between a voltage Vbe1(l) and a voltage Vbe2(l), each of which is supplied by the sensor unit 110, into a digital value, and then causes the digital calculation unit 130 to store the digital value (step S310).

Subsequently, in the temperature measuring device 100, the control unit 140 sets a parameter l as l=l+1 (Step S311), and determines whether or not the parameter l is greater than n (step S312). In step S312, when the parameter l is equal to or smaller than n, the control unit 140 returns to step S309.

In step S312, when the parameter l is greater than n, the control unit 140 calculates a mean value of the voltage ΔVbe1(j) and the voltage ΔVbe2(l) stored in the digital calculation unit 130 (step S313), and calculates a measured temperature value T by using such a mean value as an error to output the measured temperature value T (step S314).

Note that in the present embodiment, the digital calculation unit 130 calculates a mean value of the voltage ΔVbe1(j) and the voltage ΔVbe2(l), but is not limited thereto. The digital calculation unit 130 may calculate a median value or the like, instead of the mean value of the voltage ΔVbe1(j) and the voltage ΔVbe2(l). The digital calculation unit 130 may calculate a value that is a substitute for the mean value, if such a value can indicate that an error through a mean value of the voltage ΔVbe1(j) and the voltage ΔVbe2(l) is approximated.

Subsequently, in the temperature measuring device 100, the control unit 140 determines whether or not an instruction to finish measurement is received (step S315). In step S315, when an instruction to finish measurement is not received, the control unit 140 returns to step S301.

In step S314, when an instruction to finish measurement is received, the control unit 140 finishes the process, and deactivates the operation of the temperature measuring device 100.

Figure 4A:
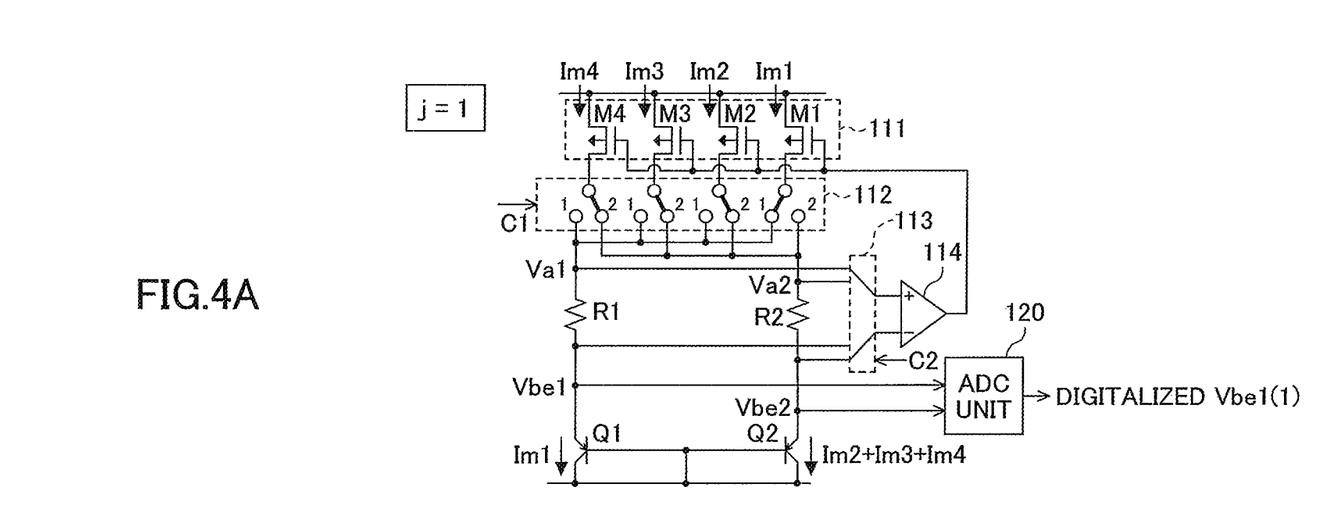
FIGS. 4A and 4B are first diagrams for explaining the operation of the temperature measuring device according to the first embodiment.
Figure 4B:
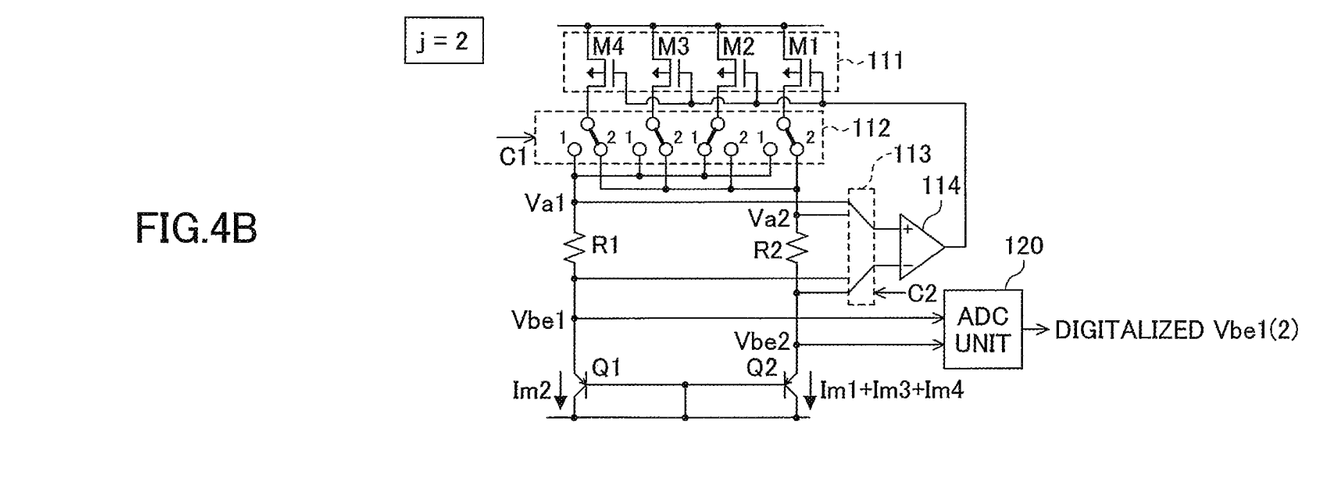
Figure 5A:
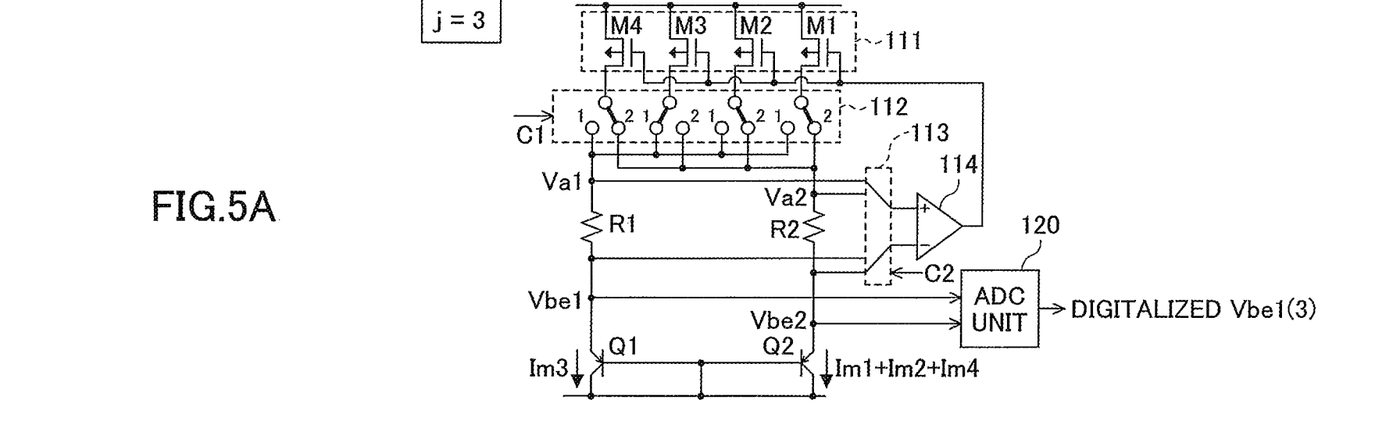
FIGS. 5A and 5B are second diagrams for explaining the operation of the temperature measuring device according to the first embodiment.
Figure 5B:
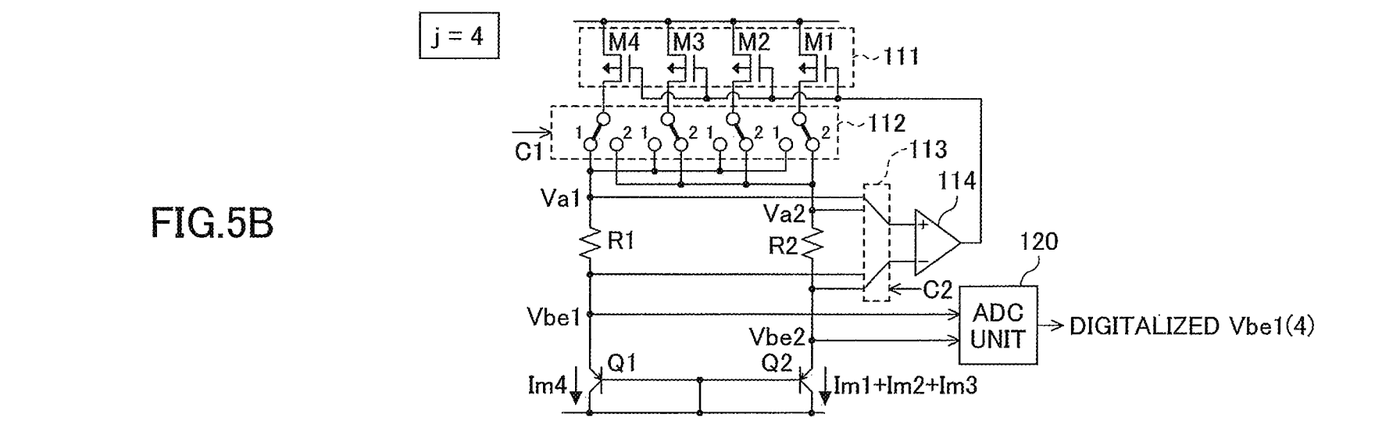

Hereafter, the operation in FIG. 3 described above is specifically described with reference to FIGS. 4A to 7B. FIGS. 4A and 4B are first diagrams for explaining the operation of the temperature measuring device according to the first embodiment. FIGS. 5A and 5B are second diagrams for explaining the operation of the temperature measuring device according to the first embodiment.

In FIGS. 4A, 4B, 5A and 5B, the operation of the sensor unit 110 is described in a case of n=4 where destinations to which the amplifier 114 is connected are set as the node n3 and the node n6. The n=4 indicates that the transistor group 111 has four transistors M1, M2, M3 and M4.

FIG. 4A is a diagram illustrating a state of the sensor unit 110 where j=1 is set by the control unit 140. FIG. 4B is a diagram illustrating a state of the sensor unit 110 where j=2 is set by the control unit 140.

In FIG. 4A, in a case of j=1, with respect to the sensor unit 110, only a transistor M1 is connected to a given node 1 of the selector 112, and transistors M2, M3, and M4 are connected to respective nodes 2.

In such a manner, a current Im1 flowing in the transistor M1 flows into the transistor Q1, and a current Im2+Im3+Im4 that is a total current flowing into the transistors M2, M3 and M4 flows into the transistor Q2.

Accordingly, the ADC unit 120 converts a voltage ΔVbe1(1), which is a difference between a voltage Vbe1 and a voltage Vbe2 resulting from the above currents, into a digital value. A converted result is stored in the latter-stage digital calculation unit 130. Note that the voltage ΔVbe1(1) is given by ΔVbe1(1)=voltage Vbe1(1)−voltage Vbe2(1).

Next, in a case of the parameter j=2, as illustrated in FIG. 4B, in the sensor unit 110, only a transistor M2 is connected to a given node 1 of the selector 112, and transistors M1, M3 and M4 are connected to respective nodes 2. In such a manner, a current Im2 flowing in the transistor M2 flows into the transistor Q1, and a current Im1+Im3+Im4 that is a total current flowing into the transistors M1, M3 and M4 flows into the transistor Q2.

Accordingly, the ADC unit 120 converts a voltage ΔVbe1(2), which is a difference between a voltage Vbe1 and a voltage Vbe2 resulting from the above currents, into a digital value. A converted result is stored in the latter-stage digital calculation unit 130.

FIG. 5A is a diagram illustrating a state of the sensor unit 110 where j=3 is set by the control unit 140. FIG. 5B is a diagram illustrating a state of the sensor unit 110 where j=4 is set by the control unit 140.

As illustrated in FIG. 5A, in a case of the parameter j=3, in the sensor unit 110, only a transistor M3 is connected to a given node 1 of the selector 112, and transistors M1, M2 and M4 are connected to respective nodes 2. Further, the ADC unit 120 converts a voltage ΔVbe1(3), which is a difference between a voltage Vbe1 and a voltage Vbe2, into a digital value. A converted result is stored in the latter-stage digital calculation unit 130.

Further, in a case of the parameter j=4, as illustrated in FIG. 5B, in the sensor unit 110, only a transistor M4 is connected to a given node 1 of the selector 112, and transistors M1, M2 and M3 are connected to respective nodes 2. Further, the ADC unit 120 converts a voltage ΔVbe1(4), which is a difference between a voltage Vbe1 and a voltage Vbe2, into a digital value. A converted result is stored in the latter-stage digital calculation unit 130.

Figure 6A:
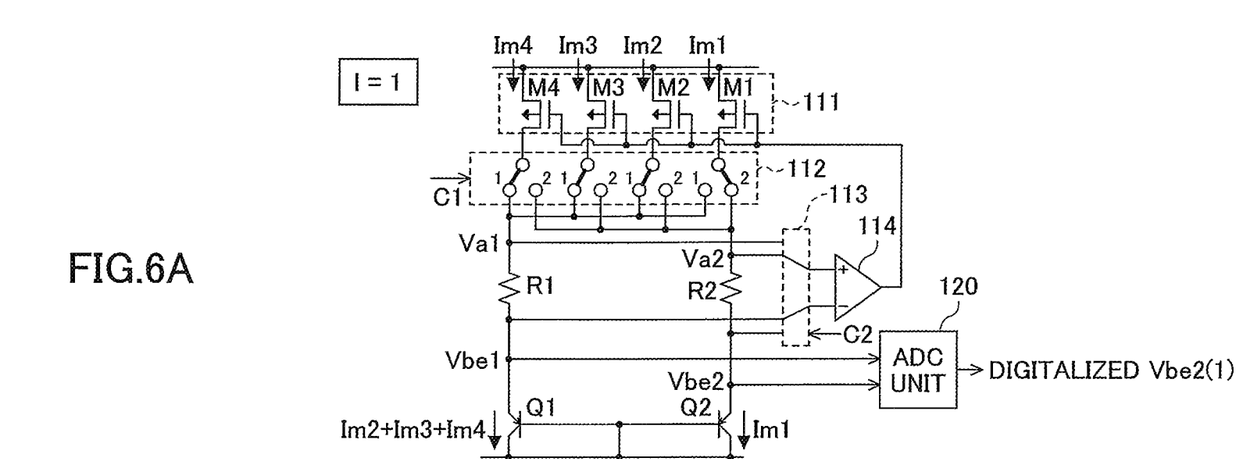
FIGS. 6A and 6B are third diagrams for explaining the operation of the temperature measuring device according to the first embodiment.
Figure 6B:
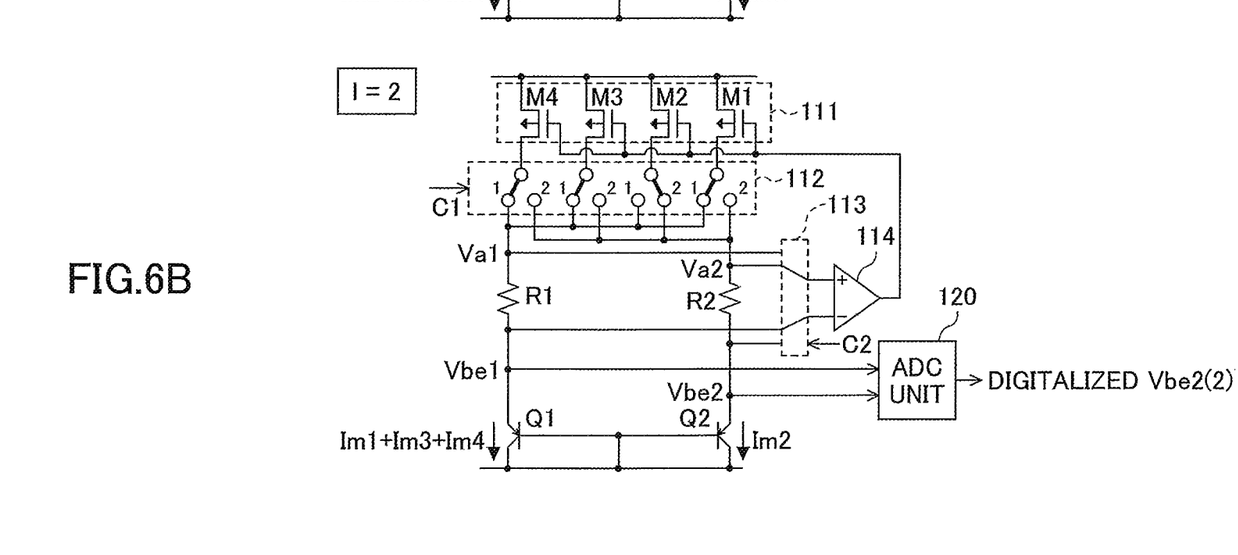
Figure 7A:
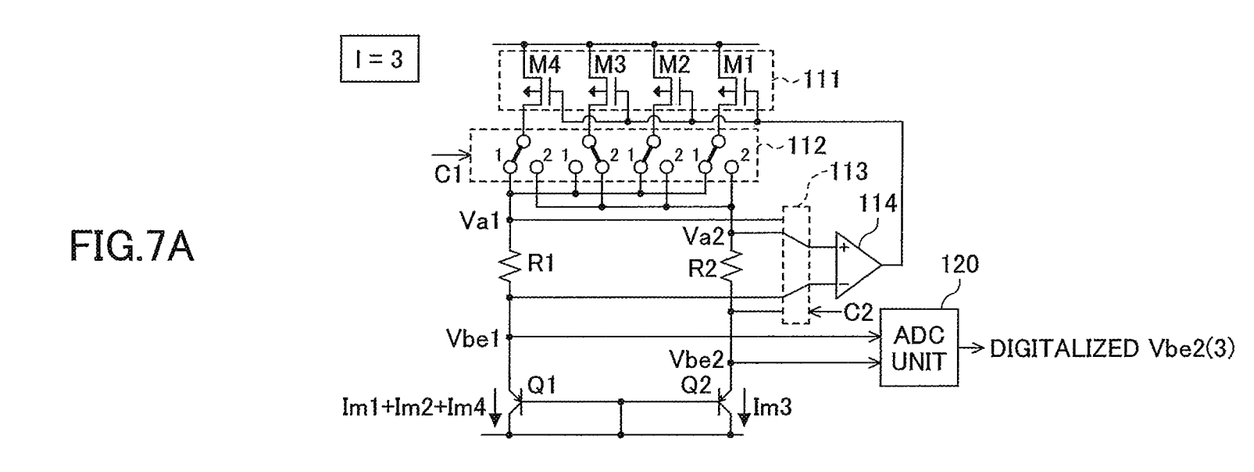
FIGS. 7A and 7B are fourth diagrams for explaining the operation of the temperature measuring device according to the first embodiment.
Figure 7B:
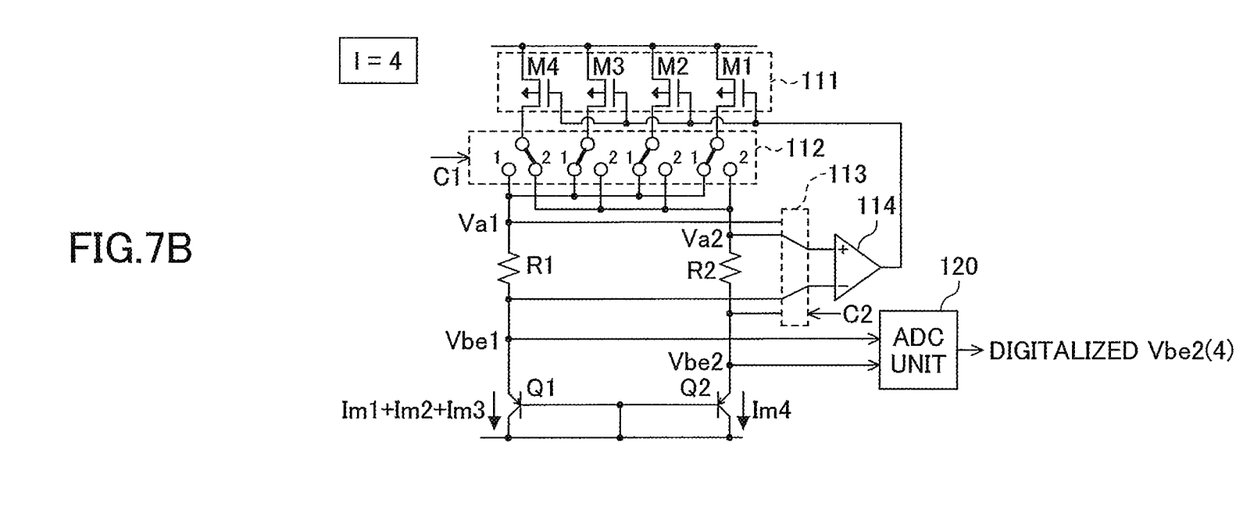

FIGS. 6A and 6B are third diagrams for explaining the operation of the temperature measuring device according to the first embodiment. FIGS. 7A and 7B are fourth diagrams for explaining the operation of the temperature measuring device according to the first embodiment.

In FIGS. 6A, 6B, 7A and 7B, the operation of the sensor unit 110 is described in a case of n=4 where destinations to which the amplifier 114 is connected are set as the node n4 and the node n5.

FIG. 6A is a diagram illustrating a state of the sensor unit 110 where l=1 is set by the control unit 140. FIG. 6B is a diagram illustrating a state of the sensor unit 110 where l=2 is set by the control unit 140.

In FIG. 6A, in a case of l=1, with respect to the sensor unit 110, only a transistor M1 is connected to a given node 2 of the selector 112, and transistors M2, M3 and M4 are connected to respective nodes 1.

In such a manner, a current Im1 flowing in the transistor M1 flows into the transistor Q2, and a current Im2+Im3+Im4 that is a total current flowing into the transistors M2, M3 and M4 flows into the transistor Q1.

That is, in this case, the relationship between the different magnitudes of the current flowing into the transistor Q1 and the transistor Q2 is opposite to the case of j=1 to 4.

The ADC unit 120 converts a voltage ΔVbe2(1), which is a difference between a voltage Vbe1 and a voltage Vbe2 resulting from the above currents, into a digital value. A converted result is stored in the latter-stage digital calculation unit 130.

Next, in a case of the parameter l=2, as illustrated in FIG. 6B, with respect to the sensor unit 110, only a transistor M2 is connected to a given node 2 of the selector 112, and transistors M1, M3 and M4 are connected to respective nodes 1. Further, the ADC unit 120 converts a voltage ΔVbe2(2), which is a difference between a voltage Vbe1 and a voltage Vbe2, into a digital value. A converted result is stored in the latter-stage digital calculation unit 130.

FIG. 7A is a diagram illustrating a state of the sensor unit 110 where l=3 is set by the control unit 140. FIG. 7B is a diagram illustrating a state of the sensor unit 110 where l=4 is set by the control unit 140.

As illustrated in FIG. 7A, in a case of the parameter l=3, with respect to the sensor unit 110, only a transistor M3 is connected to a given node 2 of the selector 112, and transistors M1, M2 and M4 are connected to respective nodes 1. Further, the ADC unit 120 converts a voltage ΔVbe2(3), which is a difference between a voltage Vbe1 and a voltage Vbe2, into a digital value. A converted result is stored in the latter-stage digital calculation unit 130.

Further, in a case of the parameter l=4, as illustrated in FIG. 7B, with respect to the sensor unit 110, only a transistor M4 is connected to a given node 2 of the selector 112, and transistors M1, M2 and M3 are connected to respective nodes 1. Further, the ADC unit 120 converts a voltage ΔVbe2(4), which is a difference between a voltage Vbe1 and a voltage Vbe2, into a digital value. A converted result is stored in the latter-stage digital calculation unit 130.

In the digital calculation unit 130 according to the present embodiment, the voltage ΔVbe1(1) to the voltage ΔVbe1(4) as well as the voltage ΔVbe2(1) to the voltage ΔVbe2(4) are stored by the operations illustrated in FIGS. 4A to 7B. By calculating a mean value ΔVave of these voltages, the digital calculation unit 130 obtains a true voltage ΔVbe through the approximation of an error indicative of a voltage ΔVbe being a difference between a voltage Vbe1 and a voltage Vbe2, caused by a mismatch between the transistors or between the resistors.

Further, the digital calculation unit 130 sets a mean value ΔVave as the true voltage ΔVbe, and calculates a measured temperature value T. Hereafter, the relationship between the measured temperature value T and the voltage ΔVbe is described. In the present embodiment, the voltage Vbe1 is expressed by Equation (1) below.

$$Vbe = (kTa/e) \times \ln(Iq1/Is) \qquad \text{Equation (1)}$$

Note that in Equation (1), k denotes the Boltzmann constant, e denotes the elementary charge, Ta denotes an absolute temperature, Iq1 denotes a current flowing into the transistor Q1, and Is denotes a saturation current when a reverse bias is applied to the transistor Q1. In Equation (2), Iq2 denotes a current flowing into the transistor Q2.

From Equation (1) above, the voltage ΔVbe is expressed by Equation (2) below.

$$\Delta Vbe = (kTa/e) \times \{\ln(Iq1) - \ln(Iq2)\} \quad \text{Equation (2)}$$
$$= (kTa/e) \times \{\ln(Iq2)/(Iq1)\}$$
$$= (kTa/e) \times \{\ln(n-1)\}$$

When there is a mismatch between the transistors in the transistor group 111, a difference between a current Iq1 and a current Iq2 results in an error due to the mismatch. Such an error being a difference between the current Iq1 and the current Iq2 due to the mismatch indicates an error of ΔVbe.

In view of the above point, in the present embodiment, each of the parameters j and l is sequentially set to 1 to n, and thus a voltage ΔVbe1(j) and a voltage ΔVbe2(l) each of which contains an error due to a mismatch between the transistors in the transistor group 111 are acquired.

Further, the digital calculation unit 130 in the present embodiment sets, as the voltage ΔVbe in Equation (2), a mean value ΔVave of the voltage ΔVbe1(j) and the voltage ΔVbe2(l), and calculates an absolute temperature Ta accordingly. The digital calculation unit 130 then outputs a measured temperature value T through an approximation of the error due to a mismatch between transistors in the transistor group 111. In this case, since k and e are physical constants, it is understood that a measured temperature value T can be obtained with improving accuracy.

Note that the digital calculation unit 130 in the present embodiment may output an absolute temperature Ta[K] as a measured temperature value T, or may calculate a measured temperature value T[° C.] from an absolute temperature Ta[K] to output the measured temperature value.

The digital calculation unit 130 also includes a storage unit that preliminarily stores Equation (2) above, the Boltzmann constant k, and the elementary charge e.

Figure 8A:
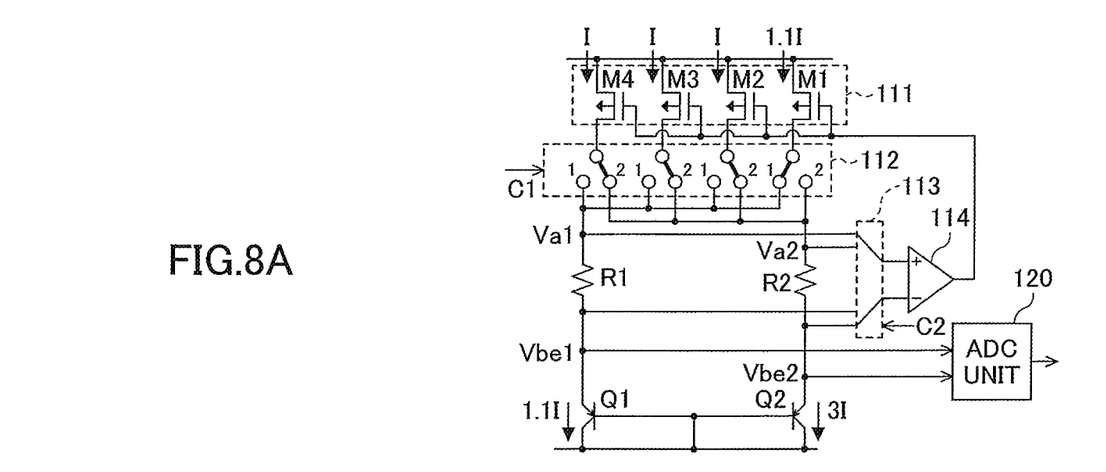
FIGS. 8A and 8B are diagrams for explaining effects of the first embodiment.
Figure 8B:
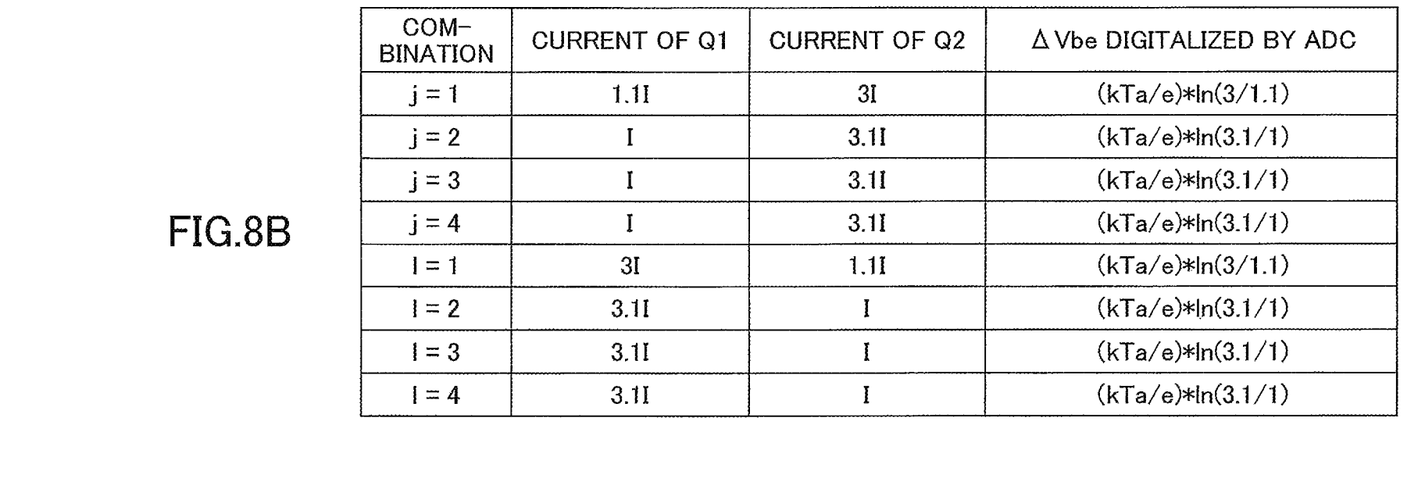

Hereafter, effects of the present embodiment are described. FIGS. 8A and 8B are diagrams for explaining the effects of the first embodiment. FIG. 8A is a diagram illustrating error of a current flowing in a current source of the sensor unit 110. FIG. 8B is a diagram illustrating a list of voltages ΔVbe1(j) and voltages ΔVbe2(l) outputted by the ADC unit 120.

In an example of FIGS. 8A and 8B, as illustrated in FIG. 8A, a case where an error of 10% due to a mismatch between transistors M is incorporated into only a current flowing into a transistor M1 in the transistor group 111 is indicated.

In this case, when a current flowing into each of the transistors M2 to M4 is set as I, a current flowing into the transistor M1 is set as 1.1 I.

FIG. 8A illustrates a state where a parameter j=1 is set by the control unit 140. In this case, a current of 1.1 I flows into a transistor Q1 through a transistor M1. In addition, a current of 3 I flows into a transistor Q2 through transistors M2 to M4.

In this case, as illustrated in FIG. 8B, a voltage ΔVbe1(1) indicates (kTa/e)×ln(3 I/1.1 I).

In such a manner, as a result of processing in which the parameter j=1 to 4 and the parameter l=1 to 4 are set, a voltage ΔVbe1(1) to a voltage ΔVbe1(4) as well as a voltage ΔVbe2(1) to a voltage ΔVbe2(4) are stored in the digital calculation unit 130, as illustrated in FIG. 8B.

In this case, a mean value of the voltage ΔVbe1(1) to the voltage ΔVbe1(4) and the voltage ΔVbe2(1) to the voltage ΔVbe2(4) is calculated by Equation (3) below.

$$(1/8) \times (kTa/e) \times \{2 \times \ln(3.0/1.1) + 6 \times \ln(3.1/1.0)\} = (kTa/e) \times \ln\{(3.0/1.1)^2 \times (3.1/1.0)^6\}^{1/8} \approx (kTa/e) \times \ln(3.002295) \quad \text{Equation (3)}$$

In addition, when there is no error for the value of the current flowing into each of the transistors M1 to M4, an expected value of the voltage ΔVbe1(1) to voltage ΔVbe1(4) and voltage ΔVbe2(1) to voltage ΔVbe2(4) is expressed by Equation (4) below.

$$(kTa/e) \times \ln(3) \quad \text{Equation (4)}$$

Accordingly, according to the present embodiment, from a ratio of Equation (3) to Equation (4), it is understood that an error indicative of a difference between a voltage Vbe1 and a voltage Vbe2 can be decreased to 1.0007≈ln(3.002295)/ln(3), i.e., 0.07%.

On the other hand, when the present embodiment is not applied, an error indicative of a difference between the voltage Vbe1 and the voltage Vbe2 is expressed by Equation (5) below.

$$\ln(3.1/1)/\ln(3) \approx 1.03 \text{ i.e., } 3\% \quad \text{Equation (5)}$$

From this, in a case of applying the present embodiment, it is understood that an error indicative of a difference between the voltage Vbe1 and the voltage Vbe2, which is caused by a mismatch between the transistors or/and variation between the resistors of the sensor unit 110, etc., is decreased from about 3% to about 0.07%.

As described above, according to the present embodiment, with the current source being included in the sensor unit 110, a downsized temperature measuring device 100 can be provided. Accordingly, the temperature measuring device 100 in the present embodiment is effective for detection at a plurality of local points on an LSI (Large-scale integrated circuit) where heat is emitted, etc., for example.

Further, according to the present embodiment, a measured temperature value is able to be calculated by a process of averaging without performing approximate calculation based on the logarithm, thereby, thus, a throughput of a digital calculation process is able to be decreased.

Second Embodiment

Hereafter, a second embodiment is described with reference to the drawings. In the second embodiment, a sensor unit does not include a selector 113, which is different from the first embodiment. Accordingly, in the following description in the second embodiment, only differences from the first embodiment will be described. For a similar functional configuration to the first embodiment, the same symbols as those used in the description of the first embodiment will be given; accordingly, explanation will be omitted.

Figure 9:
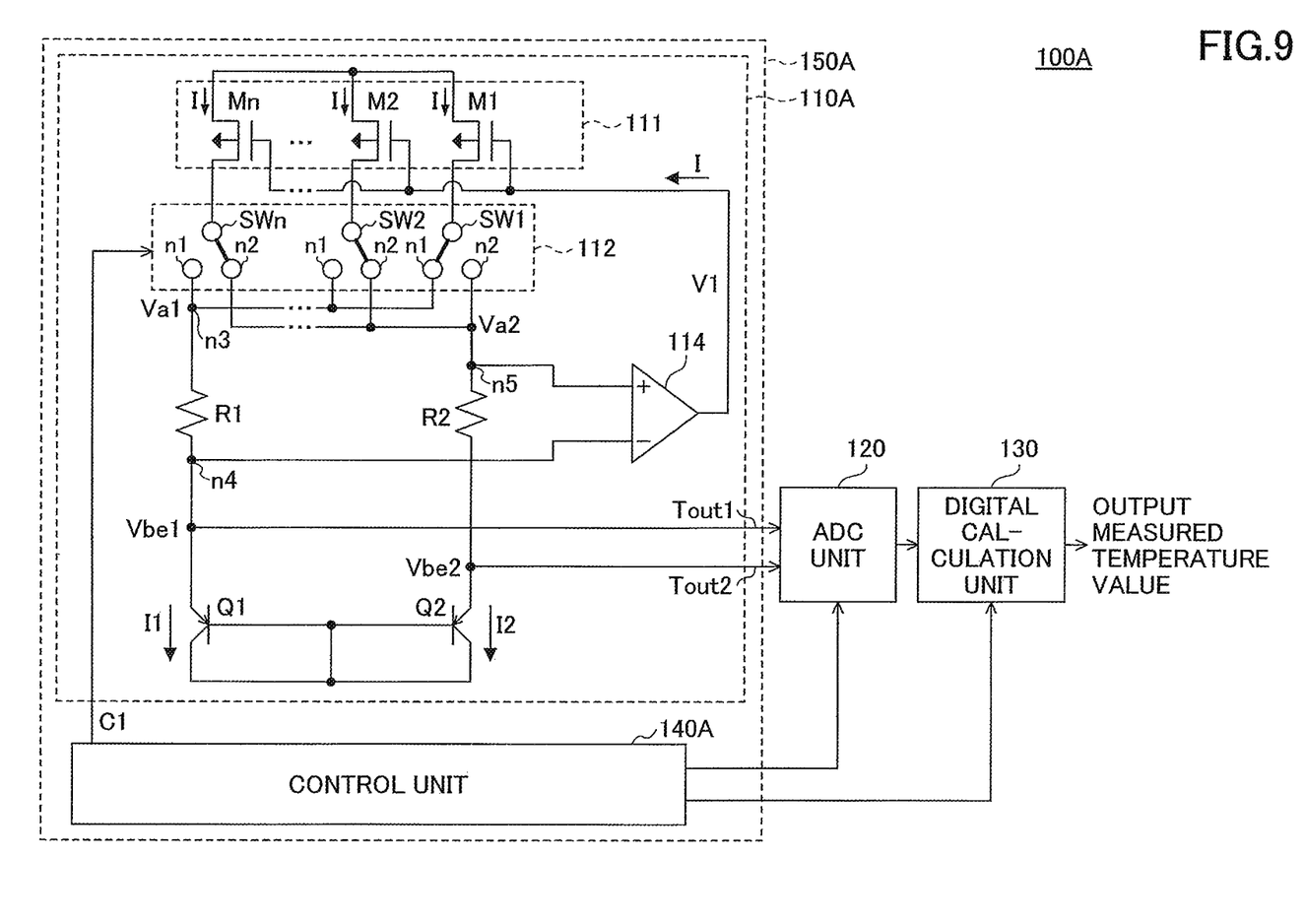
FIG. 9 is a diagram for explaining a configuration of a temperature measuring device according to a second embodiment.

FIG. 9 is a diagram for explaining a configuration of a temperature measuring device according to a second embodiment. The temperature measuring device 100A in the present embodiment includes a sensor unit 110A, an ADC unit 120, a digital calculation unit 130, and a control unit 140A.

Note that in an example of FIG. 9, the temperature measuring device 100A includes the ADC unit 120 and the digital calculation unit 130, but is not limited thereto. The ADC unit 120 and the digital calculation unit 130 may be provided outside the temperature measuring device. In this case, the sensor unit 110A and the control unit 140A can constitute a temperature measuring device 150A.

The sensor unit 110A in the present embodiment includes transistors Q1 and Q2, a transistor group 111, a resistor R1, a resistor R2, a selector 112, and an amplifier 114.

With respect to the amplifier 114 in the present embodiment, a non-inverting input terminal is connected to a node n5, and an inverting input terminal is connected to a node n4.

The control unit 140A in the present embodiment outputs a control signal C1 to the selector 112, and thus controls a destination to which each transistor in the transistor group 111 is connected. In other words, the control unit 140 sets only a parameter j, and does not set a parameter l.

Figure 10:
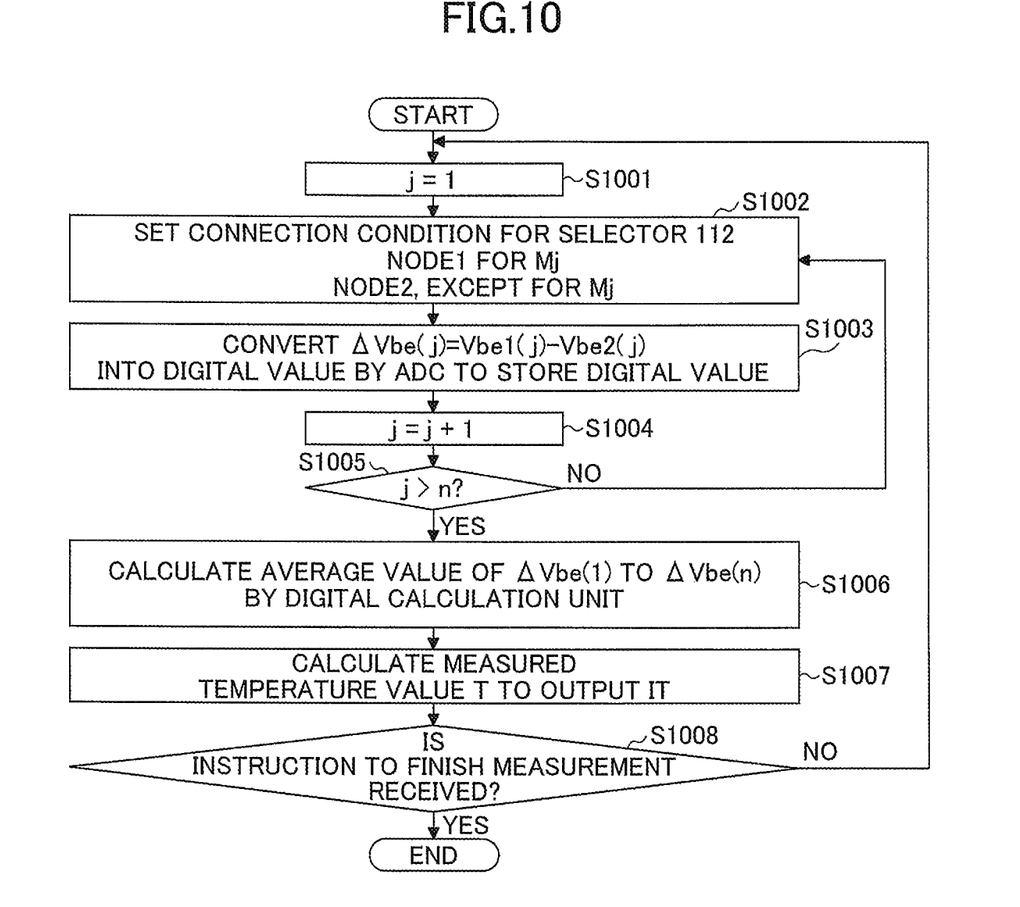
FIG. 10 is a flowchart for explaining an operation of the temperature measuring device according to the second embodiment.

Hereafter, an operation of the temperature measuring device 100A according to the present embodiment is described with reference to FIG. 10. FIG. 10 is a flowchart for explaining the operation of the temperature measuring device according to the second embodiment.

In the temperature measuring device 100A according to the present embodiment, when receiving an instruction to start temperature measurement from a host device of the temperature measuring device 100A, the control unit 140A initiates the operation (processing) illustrated in FIG. 10.

Steps S1001 to S1005 in FIG. 10 are similar to the process of steps S302 to S306 in FIG. 3; accordingly, explanation will be omitted.

In step S1005, when ΔVbe(1) to ΔVbe(n) are stored in the digital calculation unit 130, the control unit 140A causes the digital calculation unit 130 to calculate a mean value of ΔVbe(1) to ΔVbe(n) (step S1006).

Subsequently, the control unit 140A causes the digital calculation unit 130 to calculate a measured temperature value T by using the mean value of ΔVbe(1) to ΔVbe(n) to outputs it (step S1007).

Subsequently, in the temperature measuring device 100A, the control unit 140A determines whether or not an instruction to finish measurement is received (step S1008). In step S1008, when an instruction to finish measurement is not received, the control unit 140A returns to step S1001.

In step S1008, when receiving an instruction to finish measurement, the control unit 140A finishes the process, and deactivates the operation of the temperature measuring device 100A.

As described above, in the present embodiment, compared to the first embodiment, the process of calculating a mean value of ΔVbe can be simplified, and thus a throughput of the digital calculation process is able to be decreased. Accordingly, processing speed can be improved.

Explanation has been provided above for the present disclosure in relation to one or more embodiments. However, the present disclosure is not limited to the requirements described in the above embodiments. In these respects, changes can be made within the spirit of the present disclosure, and such requirements can be suitably chosen in accordance with an application manner.

Note that the transistors Q1 and Q2 in each embodiment are examples of first and second semiconductor elements set forth in the claims, the transistors M1 to Mn are examples of a plurality of transistors set forth in the claims, and the transistor group 111 is an example of a transistor group set forth in the claims. In addition, the selector 112 in each embodiment is an example of a selector set forth in the claims, the selector 113 is an example of a switching unit set forth in the claims, and the amplifier 114 is an example of an amplifier set forth in the claims.

The resistors R1 and R2 in each embodiment are examples of a first resistor element and a second resistor element set forth in the claims.

What is claimed is:

1. A temperature measuring device comprising:
    first and second semiconductor elements each of which has a p-n junction;
    a transistor group including a plurality of transistors of which respective sources are connected to a power source and of which respective gates are connected to each other, the plurality of transistors constituting a current source, the transistor group being configured to output a first current and a second current having a different magnitude from the first current to the first and second semiconductor elements, respectively; and
    a selector configured to sequentially select, as a first transistor, each transistor from among a plurality of transistors, to select a corresponding plurality of second transistors that are different from the selected first transistor and that are from among the plurality of transistors, so that, for each sequentially selected first transistor, a drain of the first transistor is connected to one of the first and second semiconductor elements and a drain of each of the corresponding plurality of second transistors is connected to another of the first and second semiconductor elements.

2. The temperature measuring device according to claim 1, further comprising:
    an AD converter configured to convert, into a digital value, a difference between a forward voltage across the p-n junction in the first semiconductor element and a forward voltage across the p-n junction in the second semiconductor element, and output the digital value; and
    a calculation unit configured to output a calculated result based on one or more output values outputted from the AD converter.

3. The temperature measuring device according to claim 2, wherein the calculation unit is configured to output the calculated result based on the output values from the AD converter.

4. The temperature measuring device according to claim 3, wherein the calculated result is a mean of the output values.

5. The temperature measuring device according to claim 1, further comprising an amplifier configured to apply, to the respective gates of the plurality of transistors, a voltage generated based on a forward voltage across the p-n junction in the first semiconductor element and a forward voltage across the p-n junction in the second semiconductor element.

6. The temperature measuring device according to claim 5, further comprising:
    a first resistor element of which one end is connected to any one or more of the plurality transistors via the selector, and of which another end is connected to the first semiconductor element, the first resistor element being configured such that a voltage drop across the first resistor element is in accordance with a current flowing into the first semiconductor element;
    a second resistor element of which one end is connected to any one or more of the plurality transistors via the selector, and of which another end is connected to the second semiconductor element, the second resistor element being configured such that a voltage drop across the second resistor element is in accordance with a current flowing into the second semiconductor element; and
    a selecting unit configured to apply, to a non-inverting input terminal and an inverting input terminal of the amplifier respectively, voltages that are either of: a voltage at a connection point between the first resistor element and any one or more of the plurality of the transistors, and the forward voltage across the p-n junction in the second semiconductor element; or a voltage at a connection point between the second resistor element and any one or more of the plurality of the transistors, and the forward voltage across the p-n junction in the first semiconductor element.

7. A method for measuring temperature comprising:

outputting, by a transistor group including a plurality of transistors, which constitutes a current source, of which respective sources are connected to a power source and of which respective gates are connected to each other, a first current and a second current having a different magnitude from the first current to first and second semiconductor elements each of which has a p-n junction, respectively; and sequentially selecting, as a first transistor, each transistor from among a plurality of transistors, and selecting a corresponding plurality of second transistors that are different from the selected first transistor and that are from among the plurality of transistors, so that, for each sequentially selected first transistor, a drain of the first transistor is connected to one of the first and second semiconductor elements and a drain of each of the corresponding plurality of second transistors is connected to another of the first and second semiconductor elements.

* * * * *

UNITED STATES PATENT AND TRADEMARK OFFICE
CERTIFICATE OF CORRECTION

| | | |
|---|---|---|
| PATENT NO. | : 11,268,865 B2 | |
| APPLICATION NO. | : 16/674928 | |
| DATED | : March 8, 2022 | |
| INVENTOR(S) | : Hiroyuki Hamano et al. | |

It is certified that error appears in the above-identified patent and that said Letters Patent is hereby corrected as shown below:

On the Title Page

Item (73), delete "Yokohama" and substitute therefor -- Kanagawa --.

Signed and Sealed this
Sixth Day of September, 2022

Katherine Kelly Vidal
*Director of the United States Patent and Trademark Office*